US012475777B2

(12) United States Patent
Ilan et al.

(10) Patent No.: US 12,475,777 B2
(45) Date of Patent: Nov. 18, 2025

(54) N-GRAM BASED CLASSIFICATION WITH ASSOCIATIVE PROCESSING UNIT

(71) Applicant: GSI Technology Inc., Sunnyvale, CA (US)

(72) Inventors: Dan Ilan, Herzliya (IL); Tomer Sery, Kochav Yair (IL)

(73) Assignee: GSI Technology Inc., Sunnyvale, CA (US)

( * ) Notice: Subject to any disclaimer, the term of this patent is extended or adjusted under 35 U.S.C. 154(b) by 793 days.

(21) Appl. No.: 17/708,044

(22) Filed: Mar. 30, 2022

(65) Prior Publication Data

US 2022/0318508 A1 Oct. 6, 2022

Related U.S. Application Data

(60) Provisional application No. 63/167,905, filed on Mar. 30, 2021.

(51) Int. Cl.
*G08B 23/00* (2006.01)
*G06F 40/284* (2020.01)
(Continued)

(52) U.S. Cl.
CPC ........... *G08B 25/003* (2013.01); *G08B 23/00* (2013.01); *G08B 25/00* (2013.01); *G06F 40/284* (2020.01);
(Continued)

(58) Field of Classification Search
CPC ...... G08B 25/003; G08B 23/00; G08B 25/00; G06F 40/284; G06F 40/289; G06K 7/10386; G06K 19/07758
(Continued)

(56) References Cited

U.S. PATENT DOCUMENTS 8,238,173 B2 8/2012 Akerib et al.
9,859,005 B2 1/2018 Akerib et al.
(Continued)

FOREIGN PATENT DOCUMENTS

WO 2019233743 A1 12/2019
WO 2020240168 A1 12/2020

OTHER PUBLICATIONS

Office Action issued in corresponding Chinese Application 202280025626.0 mailed on May 30, 2024, plus English translation thereof.

(Continued)

*Primary Examiner* — George C Monikang
(74) *Attorney, Agent, or Firm* — Heidi Brun Associates Ltd.; Heidi M. Brun

(57) ABSTRACT

A system for N-gram classification in a field of interest via hyperdimensional computing includes an associative memory array and a controller. The associative memory array stores hyperdimensional vectors in rows of the array. The hyperdimensional vectors represent symbols in the field of interest and the array includes bit-line processors along portions of bit-lines of the array. The controller activates rows of the array to perform XNOR, permute, and add operations on the hyperdimensional vectors with the bit-line processors, to encode N-grams, having N symbols therein, to generate fingerprints of a portion of the field of interest from the N-grams, to store the fingerprints within the associative memory array, and to match an input sequence to one of the stored fingerprints.

6 Claims, 5 Drawing Sheets

(51) Int. Cl.

| | |
|---|---|
| ***G06F 40/289*** | (2020.01) |
| ***G08B 25/00*** | (2006.01) |
| *G06K 7/10* | (2006.01) |
| *G06K 19/077* | (2006.01) |
| *G11C 7/12* | (2006.01) |
| *H04W 4/80* | (2018.01) |

(52) U.S. Cl.
CPC ........ *G06F 40/289* (2020.01); *G06K 7/10386* (2013.01); *G06K 19/07758* (2013.01); *G11C 7/12* (2013.01); *H04W 4/80* (2018.02)

(58) Field of Classification Search
USPC .................................................. 704/231, 251
See application file for complete search history.

(56) References Cited

U.S. PATENT DOCUMENTS

| | | | | |
|---|---|---|---|---|
| 10,153,042 | B2 | 12/2018 | Ehrman et al. | |
| 10,402,165 | B2 | 9/2019 | Lazer | |
| 10,769,150 | B1 | 9/2020 | Cruanes | |
| 2005/0038819 | A1* | 2/2005 | Hicken | G11B 27/11 |
| 2009/0043720 | A1 | 2/2009 | Reznik | |
| 2011/0013442 | A1 | 1/2011 | Akerib | |
| 2017/0316829 | A1 | 11/2017 | Ehrman | |
| 2018/0341642 | A1 | 11/2018 | Akerib | |
| 2019/0227808 | A1 | 7/2019 | Khan | |
| 2019/0370346 | A1 | 12/2019 | Xu | |
| 2020/0379673 | A1 | 12/2020 | Le Gallo-Bourdeau | |
| 2020/0380384 | A1 | 12/2020 | Kauranaratne | |
| 2020/0381048 | A1 | 12/2020 | Le Gallo-Bourdeau | |

OTHER PUBLICATIONS

"CLARAPRINT: A Chord and Melody Based Fingerprint for Westem Classical Music Cover Detection" by Mickael Arcos, uploaded to arxiv in 2009 (https://arxiv.org/ftp/arxiv/papers/2009/2009.10128.pdf).

Joshi et al., "Language Geometry using Random Indexing", Proc. 10th International Conference on Quantum Interaction, published Aug. 18, 2016.

Schmuck et al., "Hardware optimizations of dense binary hyperdimensional computing: Rematerialization of Hypervectors, Binarized Bundling, and Combinational Associative Memory", uploaded to arxiv on Apr. 3, 2019 (https://arxiv.org/pdf/1807.08583.pdf).

Kauranaratne et al., "In-memory hyperdimensional computing", Nature Electronics, 2020, 3.6:327-337.

International Search Report for corresponding application PCT/IL2022/052931 mailed on Jun. 27, 2022.

* cited by examiner

| | 'a' | 'b' | ... | 'z' |
|---|---|---|---|---|
| 0 | 1 | 0 | | 0 |
| 1 | 0 | 0 | ... | 1 |
| 2 | 0 | 1 | | 0 |
| 3 | 1 | 1 | | 1 |
| ⋮ | ⋮ | ⋮ | | ⋮ |
| 16382 | 0 | 1 | ... | 1 |
| 16383 | 1 | 0 | | 0 |

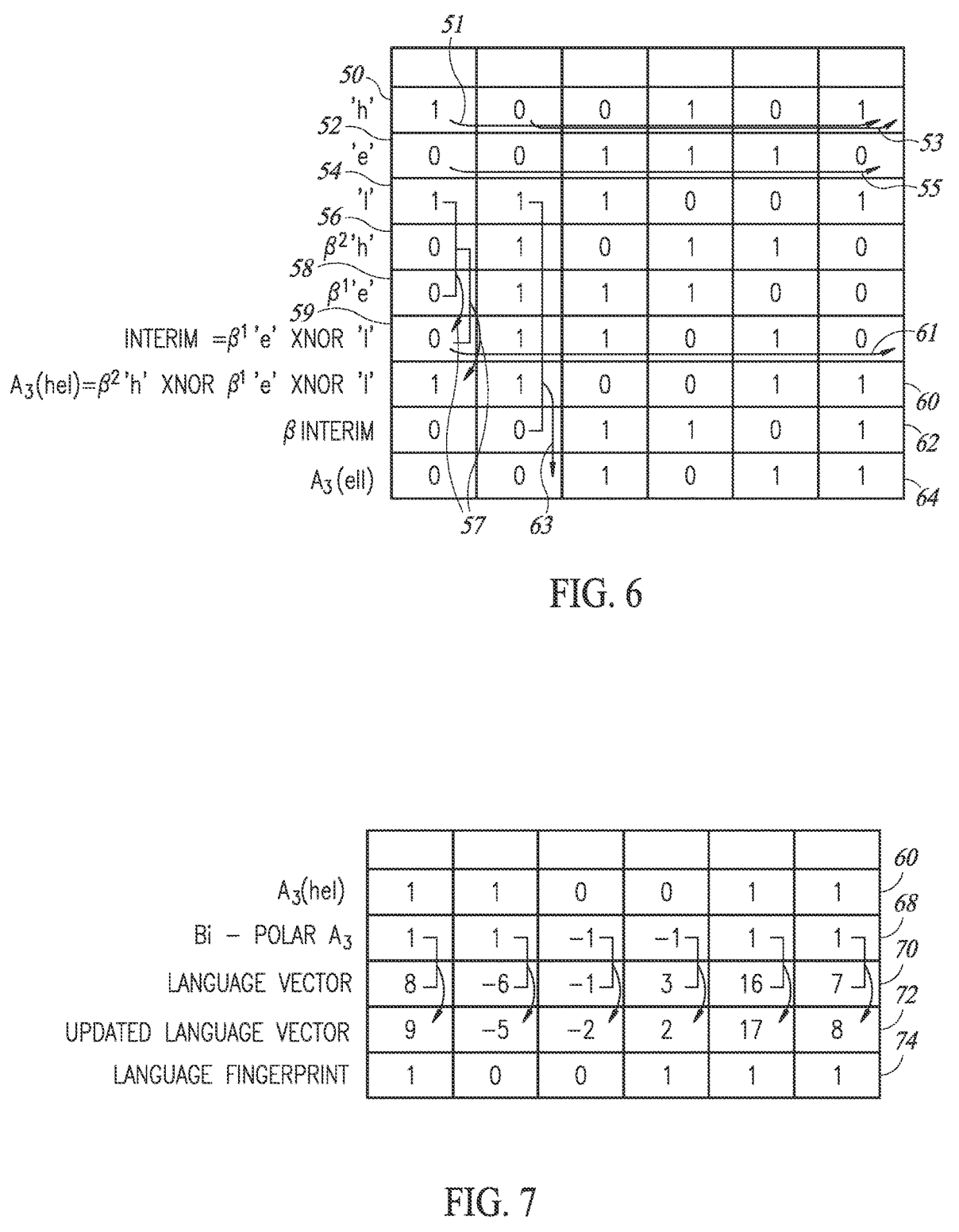

| | | | | | | |
|---|---|---|---|---|---|---|
| 'h' | 1 | 0 | 0 | 1 | 0 | 1 |
| 'e' | 0 | 0 | 1 | 1 | 1 | 0 |
| 'l' | 1 | 1 | 1 | 0 | 0 | 1 |
| $\beta^2$'h' | 0 | 1 | 0 | 1 | 1 | 0 |
| $\beta^1$'e' | 0 | 1 | 1 | 1 | 0 | 0 |
| INTERIM $=\beta^1$'e' XNOR 'l' | 0 | 1 | 1 | 0 | 1 | 0 |
| $A_3$(hel)$=\beta^2$'h' XNOR $\beta^1$'e' XNOR 'l' | 1 | 1 | 0 | 0 | 1 | 1 |
| $\beta$ INTERIM | 0 | 0 | 1 | 1 | 0 | 1 |
| $A_3$(ell) | 0 | 0 | 1 | 0 | 1 | 1 |

FIG. 6

| | | | | | | |
|---|---|---|---|---|---|---|
| $A_3$(hel) | 1 | 1 | 0 | 0 | 1 | 1 |
| Bi – POLAR $A_3$ | 1 | 1 | −1 | −1 | 1 | 1 |
| LANGUAGE VECTOR | 8 | −6 | −1 | 3 | 16 | 7 |
| UPDATED LANGUAGE VECTOR | 9 | −5 | −2 | 2 | 17 | 8 |
| LANGUAGE FINGERPRINT | 1 | 0 | 0 | 1 | 1 | 1 |

FIG. 7

N-GRAM BASED CLASSIFICATION WITH ASSOCIATIVE PROCESSING UNIT

CROSS REFERENCE TO RELATED APPLICATIONS

This application claims priority from U.S. provisional patent application 63/167,905, filed Mar. 30, 2021, which is incorporated herein by reference.

FIELD OF THE INVENTION

The present invention relates to N-gram based classification generally and to such classification using hyper-dimensional vectors in particular.

BACKGROUND OF THE INVENTION

Hyperdimensional computing (HDC) is a computational paradigm used to model the brain's neural activity patterns, taking into account the fact that most neurons receive a huge amount of input. The neural activity patterns are modeled with points of a hyperdimensional space, where each pattern is one hyperdimensional vector, called a "hypervector', and each hypervector may have 1000 to 10,000 points to it.

HDC has been used for many different types of learning applications which involve manipulation and comparison of very large patterns, typically in-memory. For example, US Patent Publication 2020/0380384 to Karunaratne et al. describes a system for hyperdimensional computing for inference tasks, such as language classification, using in-memory computing, where the memory array is a memristive array.

Reference is now made to FIG. 1, which illustrates the HDC process for language classification. A huge body of text 10, such as many books, newspapers, websites, etc., in a single language, may typically be represented by a set of feature vectors, each typically very large, such as of 16K bits. The feature vectors may be provided to a feature extractor 12 which may extract "N-grams" from feature vectors of the text. N-grams are ordered sequences of N items. In the case of language classification, N-grams are a sequence of N letters, taken in the order in which they appear in the text. Thus, if N is 3 and the text is "hello world", there are 9 distinct 3-grams: "hel", "ell", "llo", "lo_", "o_w", "_wo", "wor", "orl", and "rld", where _ indicates a blank space. This efficiently distinguishes the sequence "hel" from, say, "hle".

A language classifier 14 may operate on the N-grams to determine a characteristic fingerprint vector of the language of text 10 and may store the fingerprint in a database 16. Language classifier 14 may operate on multiple bodies of text 10, each in a different language, to generate per-language fingerprint vectors.

When a piece of text in an unknown language is received, feature extractor 12 may generate N-grams for it and may provide it to language classifier 14. Language classifier 14 may, in turn, compare its fingerprint vector with the fingerprint vectors of each language, to determine to which language the new piece of text is closest.

In HDC, each letter or symbol of a language, including the space character, is represented by a separate hypervector V of dimension D. Typically, D may be over 10,000 bits long and each bit may be randomly set to either 1 or 0. As a result of this randomness, uncorrelated hypervectors are nearly orthogonal to each other.

FIG. 2, to which reference is now briefly made, illustrates 3 hypervectors V of 16384 bits, representing the letters 'a', 'b' and 'z' in English. In the example, the hypervector for 'a' begins with the sequence 1001 and ends with 01, while the hypervector for 'b' begins with the sequence 0011 and ends with 10. The hypervector for 'z' begins with 0101 and ends with 10.

To represent an N-gram in HDC, feature extractor 12 calculates the following function on the N hypervectors representing the letters and/or symbols (such as "llo") in the N-gram:

$$A_k=\beta^{(N-1)}V[1]\text{XNOR }\beta^{(N-2)}V[2]\text{XNOR }\ldots\text{ XNOR }\beta^{1}V[N-1]\text{XNOR }V[N] \quad (1)$$

where $A_k$ is the HDC representation of the kth N-gram, XNOR is the exclusive NOR operation and $\beta^{(N-X)}V[X]$ indicates N−X permute operations (i.e. shift and rotate N−X times) on the hypervector V[X] representing the Xth symbol in the N-gram.

In HDC, in order to create a language fingerprint, language classifier 14 first converts the large plurality of N-grams $A_k$ of text 10 into a bi-polar form. The conversion to bi-polar form involves converting each "0" value to a "−1" value. Language classifier 14 then adds the large plurality of bi-polar N-grams $A_k$ into a signed global language vector, where, each vector element of HDC N-gram $A_k$ is summed separately. Finally, language classifier 14 binarizes the signed global language vector into a binary global language vector (i.e. a language fingerprint) and stores the language fingerprint in database 16.

Once the various language fingerprints have been created, language classifier 14 may then implement a "retrieval phase" where a fingerprint for an unknown language is generated and then compared to the fingerprints stored in database 16. The comparison is typically performed with a K-nearest neighbor (KNN) similarity search and produces the "Top-K" candidate language fingerprints.

Performing the operations to calculate the N-grams of equation 1 is computationally difficult on a standard CPU (central processing unit) since the hypervectors are so large. Karunaratne et al. implemented HDC in-memory, on a memristive array. However, Karunaratne et al. say that equation 1 is computationally difficult to implement as it is. Accordingly, they first converted equation 1 into a "component-wise summation of $2^{N-1}$ min-terms", and then, since the summation rises exponentially with N, they found a 2-minterm approximation which is true when N is even.

SUMMARY OF THE PRESENT INVENTION

There is provided, in accordance with a preferred embodiment of the present invention, a system for N-gram classification in a field of interest via hyperdimensional computing which includes an associative memory array and a controller. The associative memory array stores hyperdimensional vectors in rows of the array. The hyperdimensional vectors represent symbols in the field of interest and the array includes bit-line processors along portions of bit-lines of the array. The controller activates rows of the array to perform XNOR, permute, and add operations on the hyperdimensional vectors with the bit-line processors, to encode N-grams, having N symbols therein, to generate fingerprints of a portion of the field of interest from the N-grams, to store the fingerprints within the associative memory array, and to match an input sequence to one of the stored fingerprints.

Moreover, in accordance with a preferred embodiment of the present invention, the field of interest is music.

Further, in accordance with a preferred embodiment of the present invention, the controller stores interim N-gram results of a first N-gram and generates a later N-gram from the interim N-gram results of its previous N-gram.

There is also provided, in accordance with a preferred embodiment of the present invention, a method for N-gram classification in a field of interest via hyperdimensional computing. The method includes storing hyperdimensional vectors in rows of an associative memory array, and activating rows of the array to perform XNOR, permute, and add operations on the hyperdimensional vectors with the bit-line processors, to encode N-grams, having N symbols therein where N is greater than 2, to generate fingerprints of a portion of the field of interest from the N-grams, to store the fingerprints within the associative memory array, and to match an input sequence to one of the stored fingerprints.

Moreover, in accordance with a preferred embodiment of the present invention, the method includes storing interim N-gram results of a first N-gram and generating a later N-gram from the interim N-gram results of its previous N-gram.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6 is a schematic illustration of the creation of an exemplary HDC N-gram for an exemplary 3-gram of "hel" and a next 3-gram of "ell"; and FIG. 7 is a schematic illustration of the process of creating a language fingerprint, using the exemplary HDC N-gram $A_3$(hel) of FIG. 6.

Figures 1, 2:
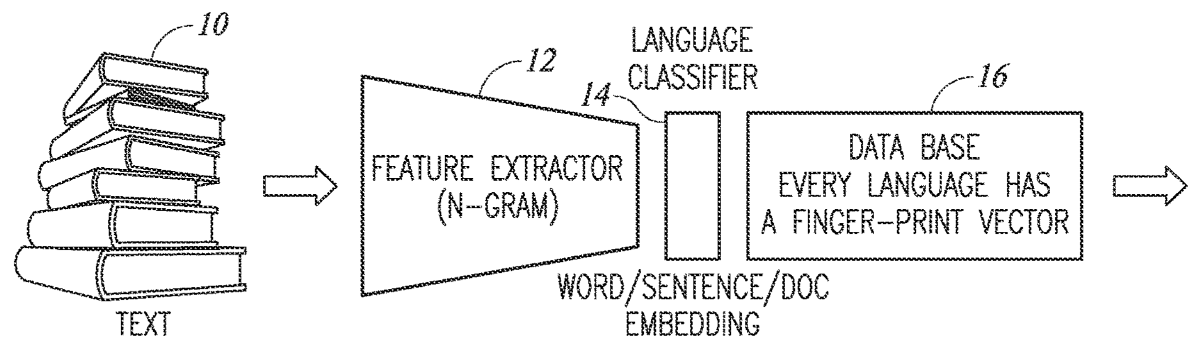
FIG. 1 is a schematic illustration of the HDC process for language classification.
FIG. 2 is a schematic illustration of 3 exemplary hypervectors V.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that there is no need to approximate the hyperdimensional computing (HDC) N-gram equation (equation 1), nor to require that N only be even. Applicant has realized that, when the HDC N-gram operation is implemented on an associative processing unit (APU), such as the Gemini APU, commercially available from GSI Technologies Inc. of the USA, the number of operations to calculate the HDC N-gram equation is linear in N, making the operation of N-gram classification, and the HDC language classification in particular, significantly faster and more efficient.

Figure 3A:
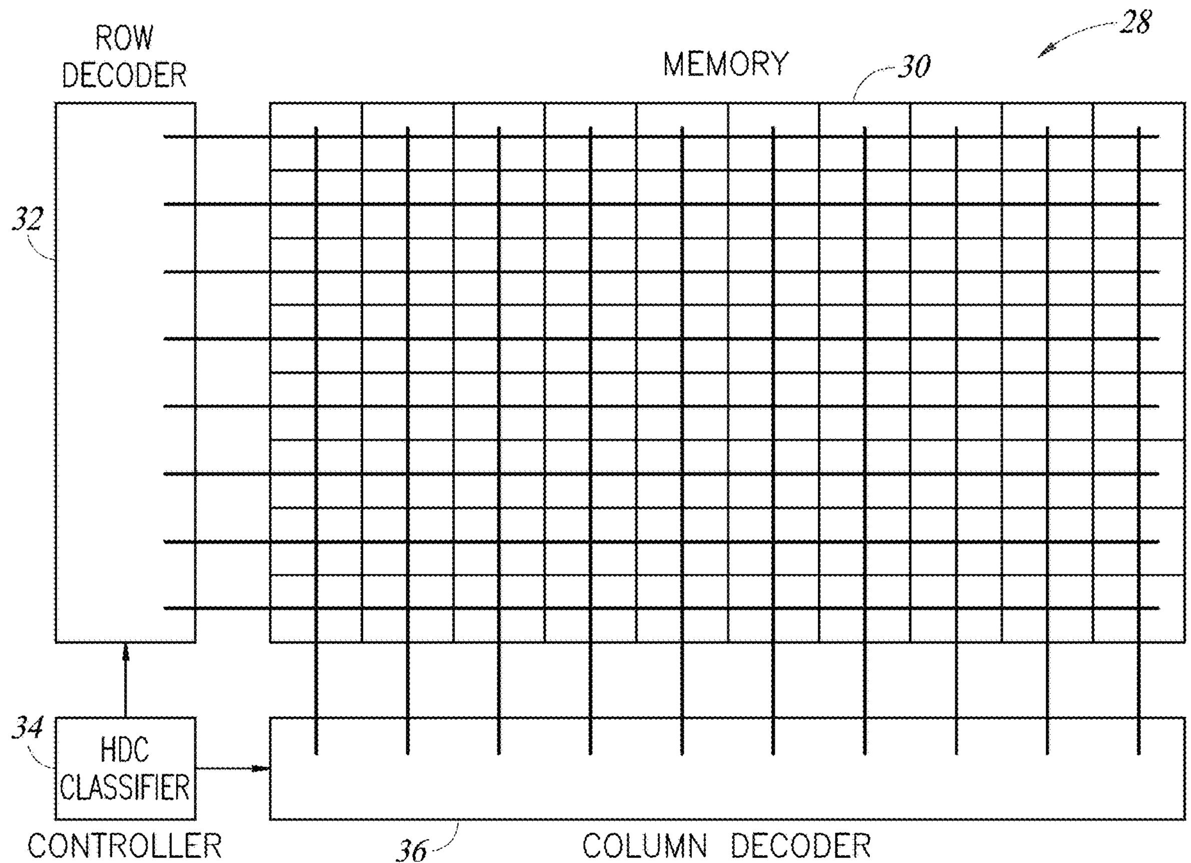
FIGS. 3A, 3B and 3C are schematic illustrations of elements of an associative processing unit, useful in the system of the present invention.
Figure 3B:
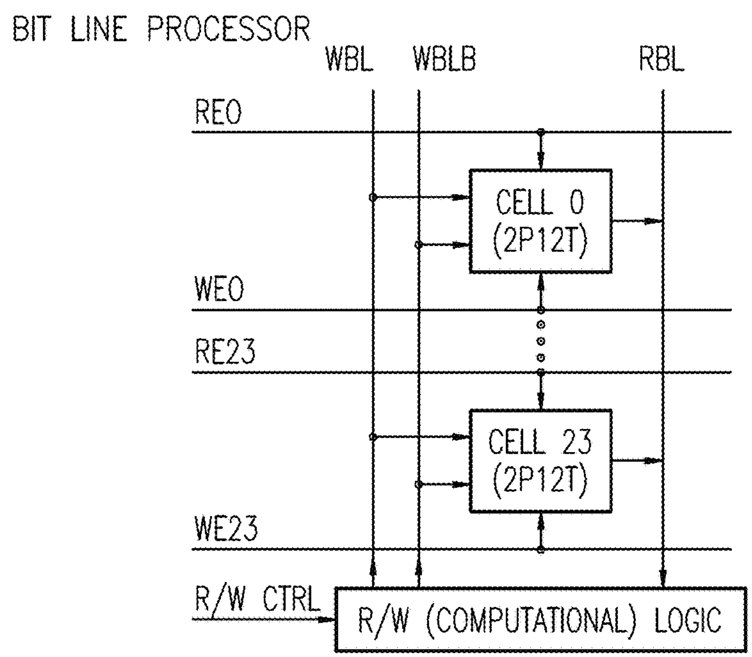
Figure 3C:
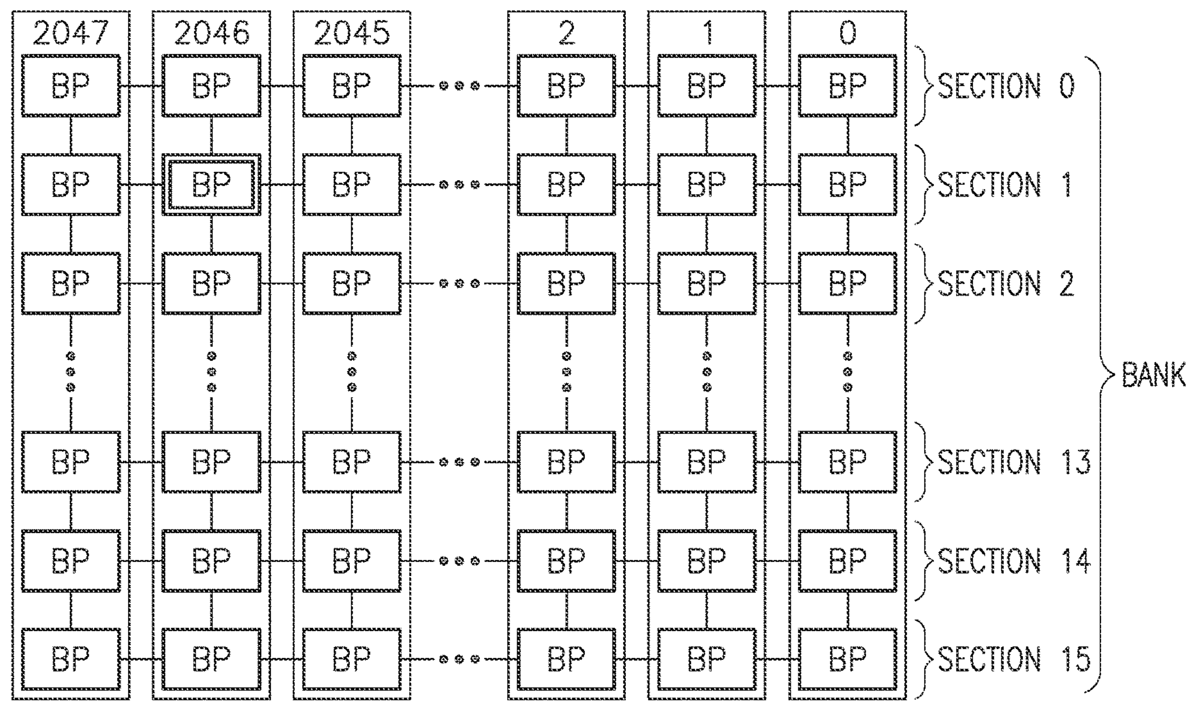

Reference is briefly made to FIGS. 3A, 3B and 3C, which together illustrate elements of an APU 28. APU 28 comprises an associative memory array 30, a row decoder 32, a column decoder 36 and a controller 34. Memory array 30 comprises a multiplicity of sections (one is shown in Fig. FIG. 3A), each having a plurality of cells arranged in rows (defined by word lines) and columns (defined by bit lines), where a vector to be operated upon may be stored in a column and a plurality of vectors may be stored at one time. Memory array 30 may be a single array or it may spread across multiple banks of memory. For example, an associative memory storage and associative processing unit is described in U.S. Pat. No. 8,238,173 (entitled "USING STORAGE CELLS TO PERFORM COMPUTATION") issued Aug. 7, 2012, and in U.S. Pat. No. 9,859,005 (entitled "MEMORY DEVICE") issued Jan. 2, 2018; both assigned to Applicant and incorporated herein by reference.

Row decoder 32 may activate multiple word lines concurrently, which may cause the cells in those rows to be activated and to provide their data to their associated bit lines. Each bit line in a section may connect a column of cells and, when multiple word lines are activated, each bit line may receive a Boolean function of the activated cells in its column. Column decoder 36 may have sense amplifiers therein which may receive the results of the Boolean function, per column. Each bit line may effect a bit line processor (FIG. 3B), providing its results to column decoder 36 and operating on the cells in its column. Exemplary bit line processors are described in U.S. Pat. No. 10,153,042 (entitled "IN-MEMORY COMPUTATIONAL DEVICE WITH BIT LINE PROCESSORS") issued Dec. 11, 2018, assigned to Applicant and incorporated herein by reference.

Each section (FIG. 3C) may provide a bit line processor BP for a single bit of a vector. A column of bit line processors may operate on a single vector and a row of bit line processors may operate on the same bit of multiple vectors, forming a memory bank. Activating multiple rows of one section may result in concurrent computation on the same bit of multiple vectors. Activating multiple rows of the multiple sections storing vectors may result in concurrent computation on the multiple vectors. Controller 34 may control the activation of the rows and the columns to perform a particular computation. For example, U.S. Patent Publication No. 2018/0341642 (entitled "NATURAL LANGUAGE PROCESSING WITH KNN") published Nov. 29, 2018, and issued on Jul. 22, 2025, under U.S. Pat. No. 12,367,346, assigned to Applicant and incorporated herein by reference, describes an exemplary K-Nearest Neighbor (KNN) search operation which can be performed by APU 14.

Figure 4:
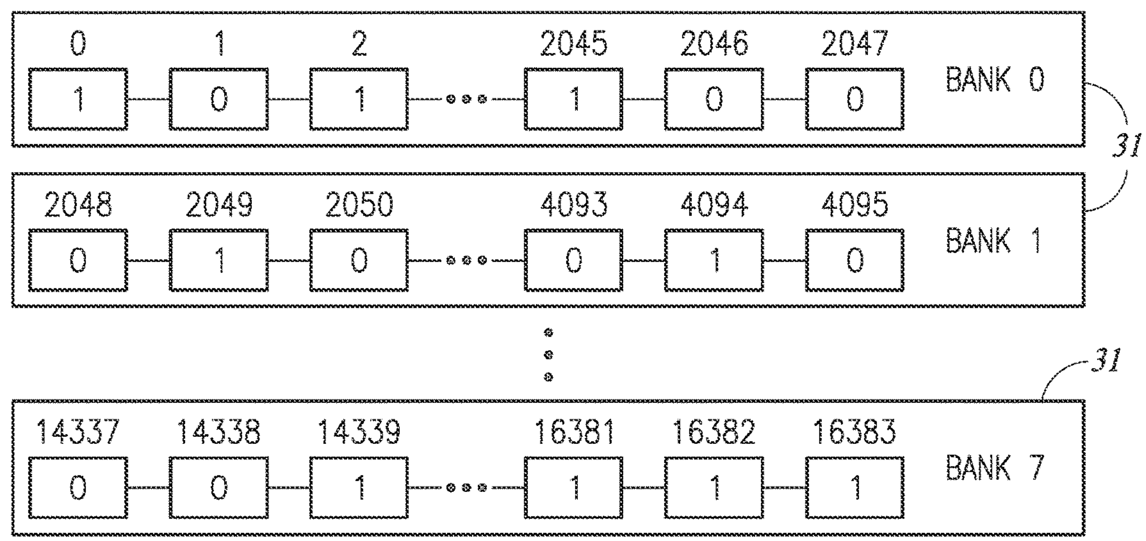
FIG. 4 is a schematic illustration of 3 storage banks for hypervectors.

In accordance with a preferred embodiment of the present invention, controller 34 may implement an HDC classifier and hypervectors V may be stored horizontally (i.e. in rows)

of associative memory array 30. Because each hypervector V may be large, they may be longer than a single row of memory array 30. In accordance with a preferred embodiment of the present invention and as shown in FIG. 4, each hypervector V may be a 16K bit vector and may be stored horizontally throughout eight banks 31, with 2K bits per row of bank 31. FIG. 4 shows 3 banks, bank 0, bank 1 and bank 7, storing bits 0-2047, 2048-4095 and 14337-16383, respectively.

For each calculation, two or more hypervectors V may be stored in the relevant rows of bit line processors BP. The relevant controllers 34 may activate multiple rows at one time thereby effecting a Boolean operation between the relevant rows in each bit line processor BP. It will be appreciated that each bit line processor BP may operate on a single bit i. The output of each bit line processor BP may be sensed by column decoder 36 and, if necessary, copied back into another row of array 30. In this manner, each Boolean operation may be performed on all bits of the hypervectors V in parallel.

Equation 1 is copied herein:

$$A_k=\beta^{(N-1)}V[1] \text{ XNOR } \beta^{(N-2)}V[2] \text{ XNOR } \ldots \text{ XNOR } \beta^{1}V[N-1] \text{ XNOR } V[N] \quad (1)$$

Where, as before, $A_k$ is the HDC-gram representation of the kth N-gram, XNOR is the exclusive NOR operation and $\beta^{(N-X)}V[X]$ indicates N−X permute operations (i.e. shift and rotate N−X times) on the hypervector V[X] representing the Xth symbol in the N-gram.

Figure 5:
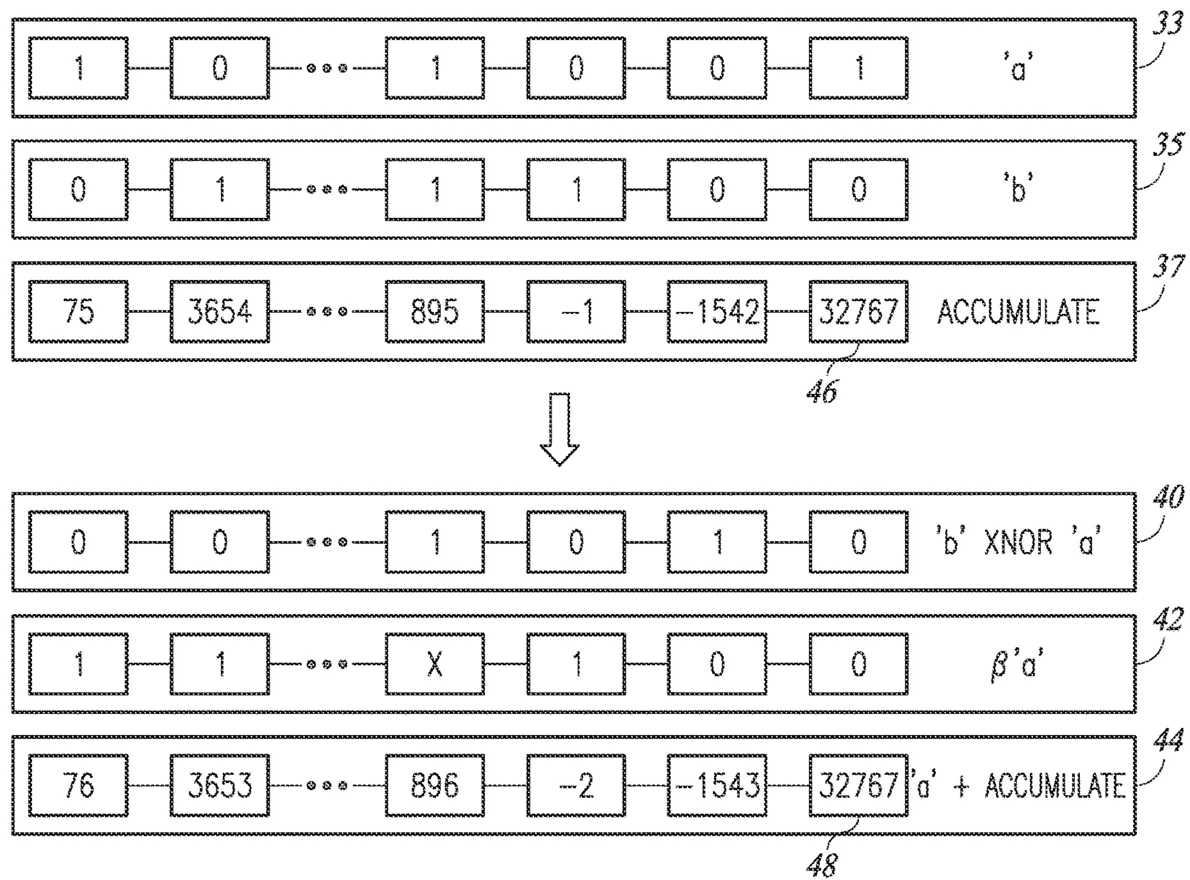
FIG. 5 is a schematic illustration of the types of operations the APU of FIGS. 3A, 3B and 3C may implement for the HDC process for N-gram classification.

Reference is now made to FIG. 5, which illustrates the types of operations controller 34 may implement for the HDC process for language classification described in the Background. Three exemplary hypervectors 33, 35 and 37 are shown, representing the letters 'a' and 'b' (hypervectors 33 and 35, respectively) and an "accumulate" vector (hypervector 37). As in the previous example, the hypervector for 'a' begins with the sequence 10 and ends with 1001, while the hypervector for 'b' begins with the sequence 01 and ends with 1100.

The accumulate vector stores a sum, not of binary values, but of "bi-polar" values. A binary vector may be converted to a bi-polar vector by converting any bits of the binary vector which are "0" to "−1". Thus, a bi-polar vector has values of "1" and "−1". The accumulate vector may accumulate the bi-polar versions of the relevant binary vector. In FIG. 5, the accumulate vector begins with the sequence of 75, 3654 and ends with the sequence of 895, −1, −1542 and 32767.

To implement the XNOR operation, controller 34 may activate the two rows storing the two hypervectors V to be multiplied and may instruct the bit line processors BP to implement a bitwise XNOR operation on them. Controller 34 may then copy the results received by the sense amplifiers in all of the columns back to a selected row of array. In the example of FIG. 5, controller 34 may activate rows 33 and 35 and may store the results of the XNOR operation between them in row 40. Note that row 40 is aligned with rows 33 and 35 and thus, the XNOR of the leftmost bits of vectors 33 and 35 (i.e. 10 XNOR'd with 01) are in the leftmost columns of row 40 (i.e. 00).

To implement the permute operation, controller 34 may activate the relevant data row and may utilize registers and logic (not shown) to shift all of the data of the data row to the right one cell and then rotate (i.e. write) the rightmost bit of the row to the leftmost bit of the row. In FIG. 5, row 42 shows the results of the permute operation on hypervector 33, which began with the sequence 10 and which ended with 1001 and was permuted to the sequence 00 ending in the sequence x100, where 'x' is the shifted value from the part of the sequence not shown in the original version of hypervector 33.

The addition operation to generate the global language vector may be implemented as an integer accumulate operation between accumulate row 36 and a selected hypervector row, such as row 33 representing the letter 'a'. To do this, controller 34 may perform an integer addition operation (as described in U.S. Pat. No. 10,402,165, entitled "CONCURRENT MULTI-BIT ADDER" issued Sep. 3, 2019. assigned to Applicant and incorporated herein by reference) between hypervector row 33 and accumulate row 36, where the integer add function may be modified to receive a bi-polar representation of hypervector row 33. Controller 34 may copy the results back to accumulate row 37. In FIG. 5, row 44 shows the results of an addition operation between accumulate row 40 and a bi-polar version of hypervector row 33. However, note that the value of the rightmost cell, labeled 46 in row 37 and 48 in row 44, did not change since its counter, at 32767, was saturated.

FIG. 6, to which reference is now made, shows the creation of an exemplary vector $A_3$(hel) for a 3-gram of "hel", where each exemplary vector V has 6 elements. In this example, 'h' is represented by a sequence 100101, 'e' is represented by a sequence 001110 and '1' is represented by a sequence 111001 and each sequence is stored in a separate row, labeled 50, 52 and 54, respectively.

Controller 34 may first permute the hypervectors for "h", "e" and "l", where the hypervector for "h" is permuted twice, that for "e" is permuted once and that for "l" is not permuted at all. In this example, the permutation is a shift left and then rotate, where the rotation is indicated by arrows 51 and 53 for twice permuted "h" and by arrow 55 for permuted "e". The results of the permutations are stored in rows 54 and 56, respectively.

Controller 34 may then XNOR the permuted values together, to produce $A_3(\text{hel})=\beta^2$'h' XNOR $\beta^1$'e' XNOR 'l', the 3-gram of "hel". To do so, controller 34 may first activate rows 54 and 58 to produce an XNOR of "l" with permuted "e" and may store the interim result in row 59. Controller 34 may then activate the row 59 with the row 56 storing twice-permuted "h". Controller 34 may write the resulting sequence of 110011, the HDC N-gram $A_3$(hel) for "hel", in row 60. These operations are bitwise operations, indicated by arrows 57 for the leftmost bit.

For the next N-gram (which, in this example, is "ell"), controller 34 may utilize the interim result stored in row 59, which stores the "once permute "e" and non-permute "l". Controller 34 may permute (indicated by arrow 61) the interim result stored in row 59, to generate twice-permuted "e" and once-permuted "l" (a sequence 001101, stored in row 62) and may then XNOR (indicated by arrow 63) row 62 with a non-permuted "1" from row 54 (a sequence 111001), generating $A_3$(ell), a sequence 001011, in row 64.

To generate the next 3-gram, for "llo", controller 34 may first generate the next interim hypervector, a temporary vector T, from the previous 3-gram, for "ell" by subtracting the twice permuted hypervector, that of "e", from the previous 3-gram, $A_3$(ell). As for the previous 3-gram, controller 34 may permute temporary vector T and may add it to the hypervector of the next symbol, that of "o".

The general process may be defined as:

1. Twice permute the hypervectors of each symbol Q to generate P2(Q) and store them.

2. Given a calculated 3-gram $A_3$(UVX), generate a temporary vector T by subtracting twice permuted hypervector P2(U) from the calculated 3-gram $A_3$(UVX) (i.e. T=$A_3$(UVX)−P2(U)). The subtraction operation may be a slightly modified XNOR operation.

3. Calculate the next 3-gram by permuting T, to generate P1(T), and adding the next hypervector to it (i.e. $A_3$(VXY)=P1(T)+Y).

Controller 34 may repeat the process for each 3-gram. Moreover, the process is extendible to N-grams, as long as the largest permutation P(n−1) is stored for each symbol. Thus, the performance improvement of doing a single permutation when calculating each sequential N-gram requires an additional storage of one multi-permuted vector per symbol.

Thus, for each N-gram other than the first one, which has to be calculated in full, controller 34 may only permute the temporary vector T and XNOR it with the hypervector of the next symbol, rather than implementing equation 1 in its entirety.

The process of creating a language fingerprint, using the exemplary HDC N-gram $A_3$(hel) of FIG. 6, is shown in FIG. 7, to which reference is now made. As mentioned hereinabove, controller 34 may add the bi-polar form of HDC N-gram $A_3$(hel) of row 60 (shown in row 68 as a sequence 11-1-111) to an accumulating signed global language vector, stored in row 70, where each vector element of bi-polar N-gram $A_k$ is summed separately. The result is shown in row 72, though controller 34 may alternatively write the result back into row 70. Once all bi-polar N-grams have been accumulated, controller 34 may binarize the resultant signed global language vector stored in row 72 into a language fingerprint, stored in row 74, by replacing each positive vector element in row 72 with a "1" and each zero or negative vector element in row 72 with a "0".

It will be appreciated that the operations of controller 34 to generate N-grams $A_k$ are simple row operations which can be performed in parallel in memory array 30 on the bits of each sequence. Thus, each operation may take only a few cycles. Similarly, the operations of controller 34 to generate each language fingerprint can also be performed in parallel in memory array 30. Moreover, once the first N-gram is determined, each following N-gram may be generated, using very simple operations, from the interim calculations of the previous one.

Controller 34 may store the resulting language fingerprint in a row of memory array 30 and may repeat the above operations for each language of interest, thereby generating a set of language fingerprints in a portion of memory array 30.

In accordance with a preferred embodiment of the present invention, controller 34 may also implement a language classifier on the set of language fingerprints stored in memory array 30. When controller 34 may receive a query text, it may generate a query language fingerprint for the query text by performing the operations discussed hereinabove.

Then, to determine the language the query text was written in, controller 34 may compute a distance, such as a Hamming distance, between the query language fingerprint and every language fingerprint stored in memory array 30. Using a KNN search operation as discussed in U.S. Pat. No. 12,367,346 (entitled "NATURAL LANGUAGE PROCESSING WITH KNN"), controller 34 may compare the resultant distance values and may choose the K ones whose distances are lowest. Sufficiently low distances indicate that the N-gram frequencies of the query text are close to the frequencies of the language of the language fingerprint. Thus, the query text is likely to be written in the matched language.

Table 1, below, shows the results when running such a fingerprint comparison on an APU and on a single thread of an Intel CPU.

| Processor | Intel CPU | APU |
|---|---|---|
| Speed | 2.7 GHz | 500 Hz |
| Hypervector length | 10,000 | 16,384 |
| Cycles per language symbol for N-gram calculation | 39,200 | 132 |
| Time per language symbol for N-gram calculation | 14.5 usec | 264 nsec |

The above table is a per bank table and there are 64 banks in APU 14. Thus, APU 14 is 55 times faster than a 64 core CPU.

It will be appreciated that the HDC process described hereinabove may be implemented for any type of input sequence classification where N-grams can be applied. It is not limited to the example provided herein of classifying languages of text or speech. It may also be utilized to classify other fields of interest, such as speech, music, EEG's, etc. In the latter, the hyperdimensional vectors may represent symbols in the relevant field of interest. For example, the article, "CLARAPRINT: A Chord and Melody Based Fingerprint for Western Classical Music Cover Detection" by Mickael Arcos, uploaded to arxiv in 2009 (https://arxiv.org/ftp/arxiv/papers/2009/2009.10128.pdf) and incorporated herein by reference, discusses a method for generating music fingerprints for music retrieval by defining chords as a musical alphabet. Controller 34 may implement the method described therein. The article uses the term "Shingle" for an N-gram and suggests to do 2-7 shingles (that is 2-gram to 7-gram).

While certain features of the invention have been illustrated and describe herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for N-gram classification in a field of interest via hyperdimensional computing, the system comprising:

an associative memory array, said array storing hyperdimensional vectors in vector rows of said array, the hyperdimensional vectors representing symbols in said field of interest, said array comprising a multiplicity of bit- lines connecting a column of cells, each of which effects at least one bit-line processor operating on activated cells in its column; and a controller configured to activate at least two vector rows of said array to perform at least XNOR, and add operations on said hyperdimensional vectors in said activated vector rows with said bit-line processors, and to copy a temporary vector output of said bit-line processors into an interim row of said array, said controller to activate said interim row with respect to at least one other vector row, said controller to perform said activate and copy operations to encode N- grams, having N symbols therein where N is greater than 2, to generate fingerprints of a portion of said field of interest from said N-grams, to store said fingerprints within said array, and to match an input sequence to one of said stored fingerprints.

2. The system of claim 1, wherein said field of interest is music.

3. The system of claim 1, said controller to store interim N-gram results of a first N-gram and to generate a later N-gram from said interim N-gram results of its previous N-gram.

4. A method for N-gram classification in a field of interest via hyperdimensional computing, the method comprising:

storing hyperdimensional vectors in vector rows of an associative memory array, the hyperdimensional vectors representing symbols in said field of interest, the array comprising a multiplicity of bit-lines connecting a column of cells, each of which effects at least one bit-line processor operating on activated cells in its column;

activating at least two vector rows of said array to perform at least XNOR, and add operations on said hyperdimensional vectors in said activated vector rows with said bit-line processors, copying a temporary vector output of said bit-line processors into an interim row of said array, said copying to activate said interim row with respect to at least one other vector row, and performing said activating and copying to encode N-grams, having N symbols therein where N is greater than 2, to generate fingerprints of a portion of said field of interest from said N-grams, to store said fingerprints within said associative memory array, and to match an input sequence to one of said stored fingerprints.

5. The method of claim 4, wherein said field of interest is music.

6. The method of claim 4, and comprising storing interim N-gram results of a first N-gram and generating a later N-gram from said interim N-gram results of its previous N-gram.

* * * * *